United States Patent [19]
Palmore

[11] Patent Number: 5,811,739
[45] Date of Patent: Sep. 22, 1998

[54] MOBILE BALE WEIGHING DEVICE

[76] Inventor: Donald Palmore, P.O. Box 92, Eureka, Nev. 89316

[21] Appl. No.: 832,607

[22] Filed: Mar. 28, 1997

[51] Int. Cl.⁶ .................................................. G01G 19/08
[52] U.S. Cl. ........................ 177/136; 177/145; 177/162; 177/171; 177/173; 177/203; 177/256; 177/263
[58] Field of Search ..................... 177/249, 250, 177/251, 136, 145, 162, 171, 172, 173, 191, 198, 203, 256, 257, 258, 259, 261, 263, DIG. 9

[56] References Cited

U.S. PATENT DOCUMENTS

| | | | |
|---|---|---|---|
| 2,982,201 | 5/1961 | Kruger et al. | 414/111 |
| 3,126,069 | 3/1964 | Shepley | 177/136 |
| 3,363,707 | 1/1968 | Murray et al. | 177/136 |
| 3,567,072 | 3/1971 | Tenhulzen | 177/136 |
| 4,359,099 | 11/1982 | Henslin | 177/140 |
| 4,362,097 | 12/1982 | Rogers | 177/136 |
| 4,465,211 | 8/1984 | van der Lely et al. | 177/145 |
| 5,384,436 | 1/1995 | Pritchard | 177/136 |

*Primary Examiner*—Hezron E. Williams
*Assistant Examiner*—Randy W. Gibson

[57] ABSTRACT

A bale weighing device for use with a mobile baler is disclosed. The weighing device comprises a support structure which is attached to the baler and pivotably supports a pivot shaft. Two balance arms are rigidly attached to the pivot shaft and support a bale chute. One of the balance arms has a forward end and a rear end which form an angle in the balance arm. The bale chute is attached to the baler by a double hinge which allows the bale chute to move vertically relative to the baler. When a bale is resting in the bale chute, the forward end of the balance arm moves upward and a pointer indicates the relative weight of the bale on a gauge. An electronic position sensor may also be used to indicate the weight of the bale.

14 Claims, 4 Drawing Sheets

MOBILE BALE WEIGHING DEVICE

BACKGROUND OF THE INVENTION

1. Field of the Invention

The present invention relates to a device for weighing bales as the bales are produced by a mobile baler.

2. Description of Related Art

In agriculture, bales are an efficient means for storing and transporting some crops. Bales are formed by packing and binding crops into a uniform shape. Generally, bales are rectangular or brick-shaped which allows a large number of bales to be stacked in stable piles.

It is always desirable when producing bales to maintain uniform bale weight regardless of the type or class of hay. Bales of uniform weight are more efficient to haul, stack, reload, and transport. In addition, uniform bale weight is essential in some markets. Some crops are bought and sold on the basis of a predetermined standard weight. For example, a bale of alfalfa sold to a retail store must generally weigh 100 pounds. If a bale exceeds the predetermined weight, the bale is too densely packed. This reduces the total number of bales a farmer may produce which in turn reduces profit made by the farmer. If a bale weighs less than the predetermined weight, the customer will receive a substandard bale. Therefore, it is often desirable to monitor and regulate the weight of bales as they are being produced to ensure the bales are within a predetermined range of weight.

Devices for weighing bales are well known in the art. For example, U.S. Pat. No. 2,982,201 issued to Kruger et al., U.S. Pat. No. 3,126,069, issued to Shepley, U.S. Pat. No. 3,363,707, issued to Murray et al., and U.S. Pat. No. 5,384,436, issued to Pritchard, disclose weighing apparatuses which may be used to weigh bales as they are produced by a mobile baler. However, none of these devices provide an efficient, durable, and cost effective means for monitoring the weight of bales as they are being produced.

The devices disclosed in each of the references above utilize a bale chute which is attached to a baler through a single pivot point, similar to the way a door is attached to a frame. As bales are discharged by the baler, they are deposited on the bale chute. The weight of the bale causes the bale chute to pivot around the single pivot point and various springs and mechanical linkages are used to indicate the weight of the bale on a scale. Pritchard utilizes electric strain gauges or load cells to calculate the weight of the bale instead of a mechanical scale.

One of the disadvantages of the single pivot point design is that it is difficult to obtain an accurate weight measurement. Single pivot point bale chutes tend to oscillate like a pendulum from the motion of the baler as it moves across a field. Even relatively smooth fields can cause large oscillation of the chute which are located at the extreme end of the baler where the accelerations are greatest. Oscillations may also be caused by a bale being suddenly loaded into the bale chute. Dampening devices may be used to reduce oscillation but these devices interfere with the accurate measurement of the bale. The Oscillations also tend to wear out the components of the weighing devices, such as mechanical linkages, because of the constant accelerations and motion.

The single pivot point design, such as the embodiment disclosed in Shepley, is also dependent on the position of a bale in the bale chute. The farther the bale is behind the pivot point, the greater the torque produced by the bale and the greater the indicated weight of the bale on the scale. Since it is extremely difficult to ensure that all bales are in the same position on the bale chute when weight measurements are taken, this design tends to give inaccurate measurements.

The devices disclosed in the above-cited references also have poor reliability. Farm equipment is subjected to a severe environment which is very damaging to equipment. The fragile springs, gauges, and mechanical linkages used in the references above are highly susceptible to corrosion, wear, and failure. Furthermore, the devices disclosed in the above-cited references require specially designed components, such as bale chutes, and cannot use existing components. This increases the manufacturing cost of these devices. The device disclosed in Pritchard also utilizes expensive electrical components which further increase the cost of the device.

SUMMARY OF INVENTION

1. Objects of the Invention

It is an object of the present invention to provide a weighing device for weighing bales which are produced by a mobile baler.

It is a further object of the present invention to provide the device described above which is capable of indicating the weight of a bale while the baler is producing bales.

It is another object of the present invention to provide a bale weighing device which is simple and reliable.

It is a further object of the present invention to provide a bale weighing device which is primarily mechanical and includes means for mechanically indicating the weight of a bale.

It is a further object of the present invention to provide a bale weighing device wherein an operator of a mobile baler may observe the weight of a bale while the operator is driving the mobile baler.

It is a further object of the present invention to provide a bale weighing device which is inexpensive to manufacturer and maintain.

It is a further object of the present invention to provide a bale weighing device which may be used with existing bales chutes with little modification.

It is another object of the present invention to provide a bale weighing device which an electrical position sensor which may be used to indicate the relative weight of a bale.

These and other objects of the present invention may be realized by reference to the specification, claims, and abstract.

2. Brief Description of the Invention

The present invention comprises a support structure, a bale chute, a balance arm with a pointer, and a scale. The support structure is attached to a mobile baler at the point where the bales are ejected from the baler. The support structure pivotably supports a pivot shaft which is rigidly attached to two balance arms. The bale chute is suspended from the balance arms by chains.

The bale chute is adapted to receive a bale as it is ejected from the mobile baler. The bale chute is attached to the mobile baler by a double hinge device which allows the chute to move vertically relative to the mobile baler. At least one of the balance arms includes a forward portion with an attached pointing device. As a bale is ejected from the mobile baler, it is received by the bale chute and the weight of the bale causes the balance arms to pivot. The forward end of the balance arm then moves upward and the pointing device points to the vertical gauge which indicates the relative weight of the bale. Weights may also be attached to the forward end of the balance arm to counter balance the chute and the bale. The weights are selected so that the balance arm reaches equilibrium and the pointing device points to a predetermined value on the gauge when a bale of a predetermined weight is resting on the bale chute.

In an alternative embodiment, an electronic position sensor may be used to electronically indicate the relative weight of a bale. The position sensor may be any of a number of devices which are well known in the art. In this embodiment, the weight of a bale may be indicated by lights, a large face dial, a speaker, or a numerical display.

In either embodiment, the operator of the mobile baler may observe the weight of a given bale by observing either the mechanical or electric gauge. When an electrical position sensor is used, the sensor output may be transmitted to the instrument panel or dash board of the mobile baler or tractor, if a tractor is used to pull the baler. An operator can maintain uniform bale weight by frequently observing the gauge and adjusting the tensioning device of the baler.

Figure 1:
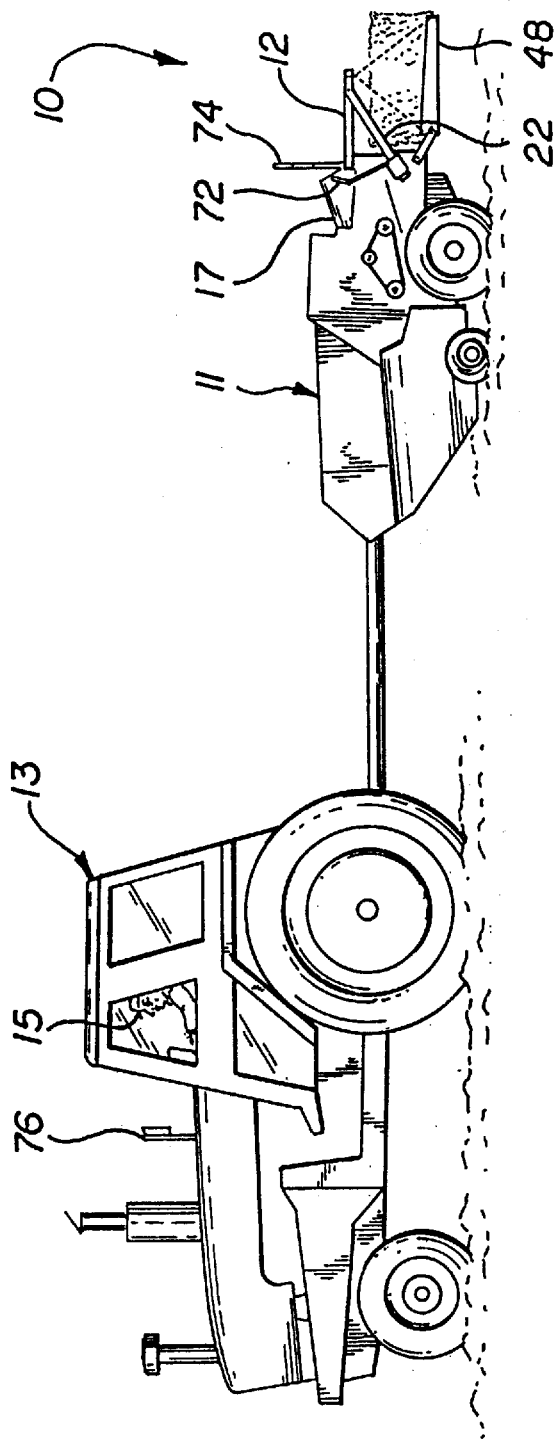
FIG. 1 is a side view of the weighing device of the present invention attached to a baler which is in turn attached to a tractor.

REFERENCE NUMERALS 10 device
11 mobile baler
15 operator
12 support beam
13 tractor
14 support beam
16 beam
17 baler chamber
18 pivot shaft
19 bearing
20 balance arm
21 bale
22 balance arm
24 eye
26 eye
28 pivot
30 pivot
40 chain
42 chain
44 bale guide
46 bale guide
48 bale tray
50 bale roller
52 bale chute
60 hinge member
62 hinge member
64 bale slide
66 bolts
68 bolts
70 weights
72 pointer
74 gauge
76 mirror
78 forward portion
79 rear portion
80 position sensor
82 indicator
84 wire
86 wire

DESCRIPTION OF THE PREFERRED EMBODIMENT

As seen in FIG. 1, the present invention comprises a weighing device generally indicated as reference number 10. Device 10 is normally attached to a mobile baler 11 which may be pulled by a tractor 13. Device 10 is designed to be used with a large variety of balers and tractors. For example, baler 11 may be a Freeman 370 baler which produces a three-twine bale. Tractor 13 may have a mirror 76 which allows an operator 15 to view mobile baler 11 while the tractor and baler progress down a field. Mirror 76 also allows operator 15 to observe the operation of weighing device 10. The present invention may also be used with self-propelled balers, in which case there is no need for a tractor to pull the baler.

Most balers have a tensioning device which controls how densely a bale is packed. Since bales from a particular baler generally have a uniform volume, the density of the bale determines the weight of the bale. The operator of the baler may adjust the tensioning device to vary the weight of the bales. Tensioning devices are well known in the art as are devices for producing bales.

Figure 2:
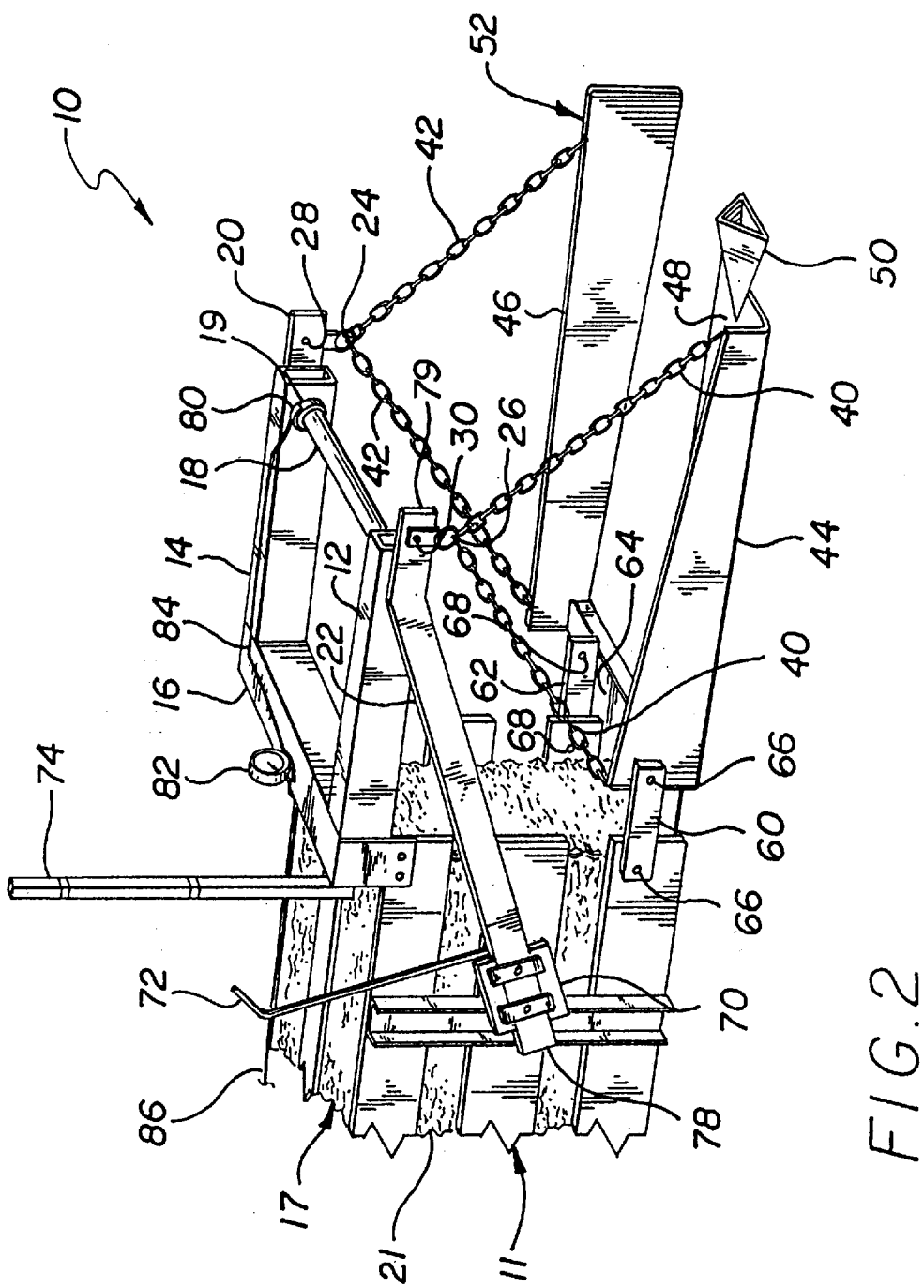
FIG. 2 is an isometric view of the weighing device of the present invention attached to a baler.
Figure 3:
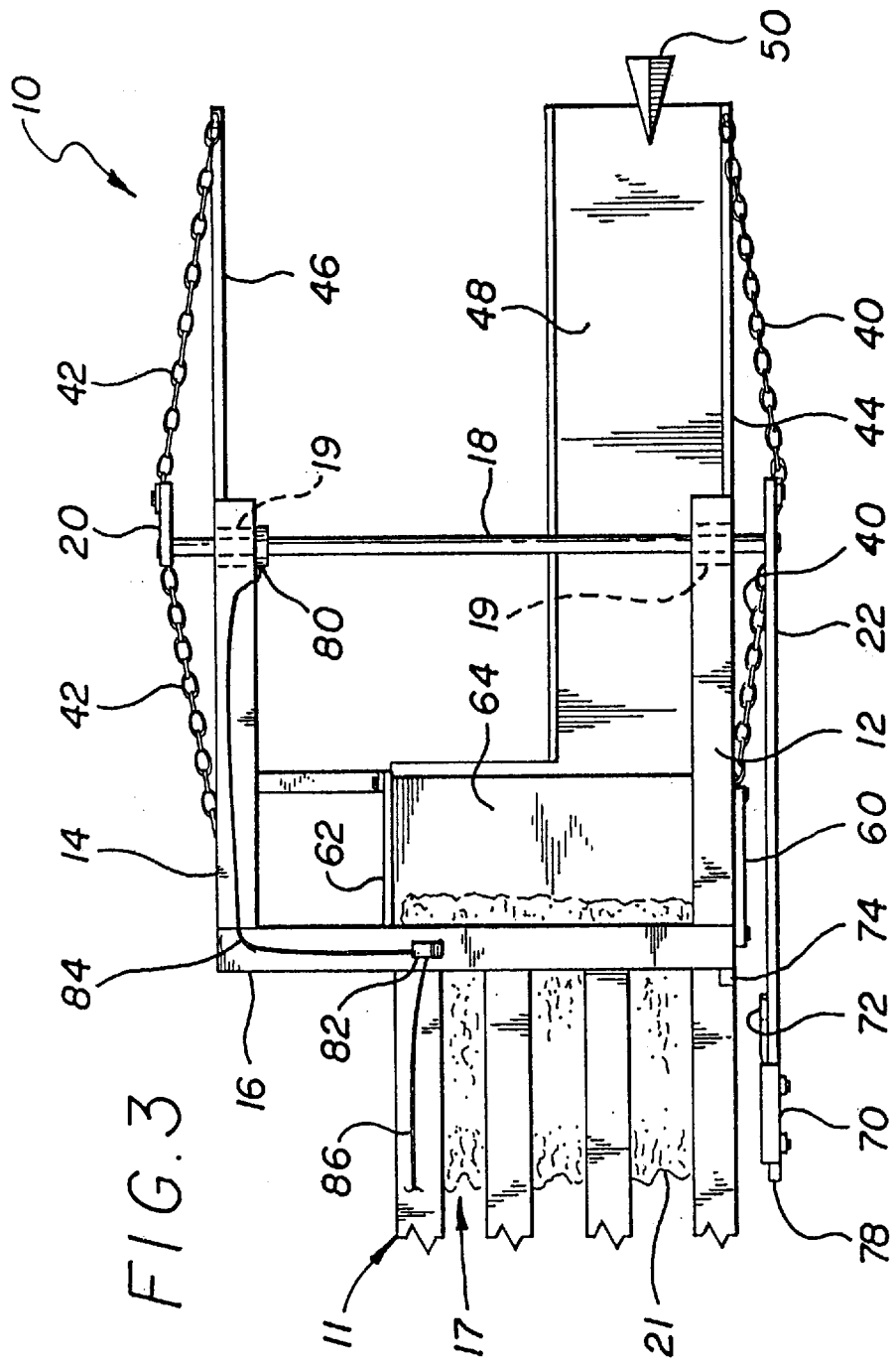
FIG. 3 is a top view of the weighing device of the present invention attached to a baler.

As seen in FIGS. 2 and 3, device 10 generally comprises a support structure, a balance arm with an indicating means, a bale chute, and a scale. These components are preferable made of steel, but other materials, such as aluminum, may be used, provided the chosen material is strong enough to withstand the stresses encountered by the present invention.

The support structure comprises support beams 12 and 14 which are attached to a beam 16. It is recognized that the support structure may take other configurations, such as a single support beam, and still achieve the objectiveness of the present invention. Support beams 12 and 14 are sturdy enough to hold the balance arm and bale chute of the present invention as well as a heavy bale. Beam 16 is securely fastened to a baler chamber 17 of mobile baler 11. In normal operation, mobile baler 11 produces a bale and ejects the bale out of chamber 17.

Support beams 12 and 14 pivotably support a pivot shaft 18 which is rigidly attached to balance arms 20 and 22. A bearing 19 may be used to support pivot shaft 18 in both support beams 12 and 14. This allows pivot shaft 18 to freely pivot while a bale is supported in a bale chute 52. Eyes 24 and 26 have pivots 28 and 30 and are attached to balance arms 20 and 22, respectively. Eyes 24 and 26 fasten chains 40 and 42 to the balance arms.

Chain 40 supports bale guide 44 and chain 42 supports bale guide 46. A bale tray 48 is attached to bale guide 44 and provides a surface upon which a bale may rest. Collectively, bale guides 44 and 46 and bale tray 48 form bale chute 52. Many different kinds of bale chutes may be used with the present invention. The bale chute need only hold the bale momentarily to obtain a weight reading. Because bale chute 52 is further behind bale chamber 17, it allows bale chute 52 to hold a bale for a longer period of time. This allows the present invention to obtain a more accurate weight reading than prior art devices.

A bale roller 50 may be attached to the rear end of bale tray 48 for forcing bales to roll off of bale tray 48. As bales are ejected from baler chamber 17, they are forced onto bale tray 48 and eventually are lifted by bale roller 50. As the bale is lifted, its center of gravity shifts off of bale tray 48 and the bale falls through the gap between bale tray 48 and bale guide 44. The present invention may also be used with bale chutes which do not utilize a bale roller.

Hinge members 60 and 62 form a double hinge mechanism and attach bale chute 52 to chamber 17. Hinge member 60 is privotably attach to chamber 17 and bale guide 44 by bolts 66. Similarly, hinge member 62 is pivotably attached to chamber 17 and bale guide 46 with bolts 68. A bale slide 64 is provided between chamber 17 and bale chute 52 to provide a surface on which a bale 21 may slide from chamber 17 to bale chute 52. Unlike prior art devices which are attached to a baler through a single pivot point, hinge members 60 and 62 provide a double hinge movement which allows bale chute 52 to move vertically relative to chamber 17, yet bale chute 52 remains substantially perpendicular to the force of gravity. Hinge members 60 and 62 also prevent bale chute 52 from oscillating laterally relative to baler 11.

Balance arm 22 has a forward portion 78 and rear portion 79. Forward portion 78 and rear portion 79 form an angle which is preferably substantially 20 degrees which produces a variable torque. The higher forward portion 78 is raised, up to a horizontal position, the greater the counterclockwise torque (downward force) produced by the weight of forward portion 78.

Weights 70 may be attached to forward end 78 to counter balance bale chute 52. When no bale is resting in bale chute 52, weights 70 have sufficient mass to lower forward end 78 and raise bale chute 52. This is the normal empty position of device 10. Pointer 72 is attached to balance arm 22. A gauge 74 may be attached to beam 16 or chamber 17. Gauge 74 has markings to indicate different ranges of weight. The markings may be bands of different colors or numbers. When a bale of a given weight is resting in bale chute 52, the combined weight of forward end 78 and weights 70 have sufficient mass to achieve an equilibrium while pointer 72 is pointing to a predetermined value on gauge 74. The position of weights 70 may be adjusted by sliding the weights along forward end 78. By changing the relative position of weights 70, the torque produced by forward end 78 is changed. Alternatively, weights of different mass may be attached to forward end 78.

Figure 4:
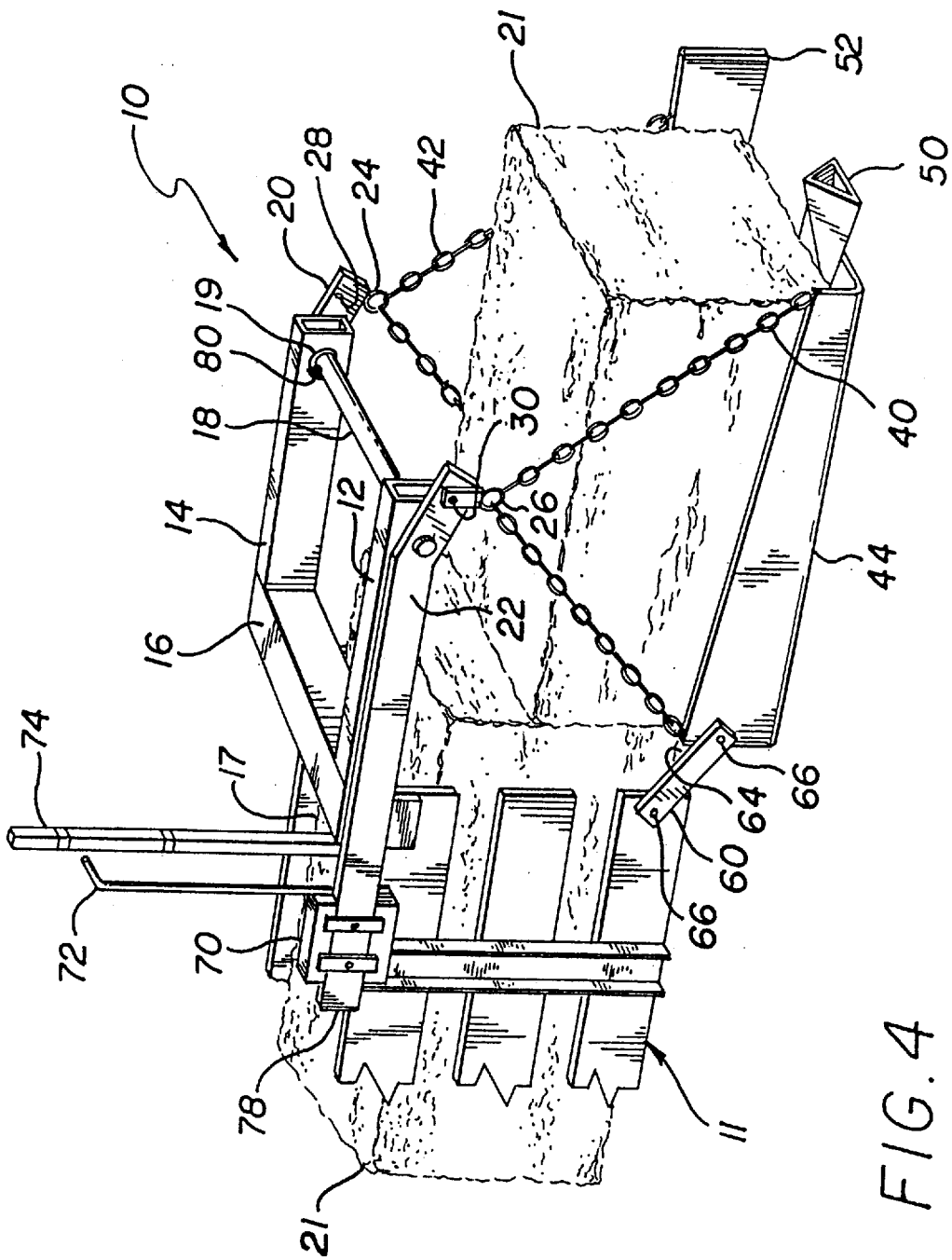
FIG. 4 is an isometric side view of the weighing device of the present invention with a resting in the bale chute of the present invention.

As bale 21 is ejected from chamber 17 it is deposited in bale chute 52, as seen in FIG. 4. The weight of bale 21 lowers bale chute 52 and raises forward end 78 of balance arm 22 until an equilibrium or balance is reached. As forward end 78 is raised, pointer 72 points to gauge 74. Operator 15, perhaps looking in mirror 76 of tractor 13 (see FIG. 1), can see the relative weight of bale 21 by observing where on scale 74 pointer 72 is pointing.

Because balance arm 22, weights 70, and bale chute 52 are all subjected to the same movements and accelerations, and bale chute 52 is attached to baler 11 through a double-hinge mechanism, device 10 oscillates significantly less than prior art devices. Less oscillation allows an operator to obtain a more accurate weight measurement and the device is subjected to less stress and wear.

The present invention is also an improvement over prior art devices because it does not use complex or frail mechanical linkages to link the bale chute to a scale. The present invention is comprised of sturdy components which are able to withstand the difficult conditions found on farms and require little or no maintenance.

Returning to FIGS. 2 and 3, in an alternative embodiment, a position sensor 80 may also be used to indicate the relative weight of bale 21. Position sensor 80 may be any number of devices which are known in the art and which can determine the relative position of pivot shaft 18 or of balance arms 20 or 22. For example, position sensor 80 may be a magnetic field sensor with a magnet attached to pivot shaft 18. Wire 84 runs from position sensor 80 to indicator 82. Indicator 82 may be a simple light or series of lights, a large face dial, a speaker, or a numerical display. A wire 86 may run from device 10 to a power source to supply electrical power to position sensor 80 and indicator 82. Wire 86 may also be used to transmit a signal produced by position sensor 80 to the control panel or dash board of tractor 13. Any of the indicators mentioned above can be used in the control panel of tractor 13. When indicator 82 is placed in tractor 13, operator 15 will not need to look rearward to see the relative weight of the bales being produced.

SUMMARY

It may be realized from the above description, that the present invention provides a device for efficiently measuring the weight of bales as they are produced by a mobile baler. Compared to the prior art, the present invention is simpler, more reliable, and requires less maintenance. In addition, the present invention is also more accurate because it is significantly less susceptible to oscillations and is not dependent on the position of a bale in the bale chute.

Although the description above contains many specifications, these should not be construed as limiting the scope of the invention but as merely providing illustrations of some of presently preferred embodiments of this invention. Thus, the scope of the invention should be determined by the appended claims and their legal equivalents rather than by the examples given.

What is claimed is:

1. A weighing device for measuring the weight of bales produced by a mobile baler while the baler is making bales, the mobile baler having an exit chute through which bales are discharged, the bale weighing device comprising:

(A) a support structure attached to the baler and located above the exit chute for supporting the weighing device, (B) a gauge attached to the baler for indicating weights, said gauge being visible to an operator of the baler, (C) at least one balance arm pivotably attached to said support structure at a pivot point on said balance arm for providing a balancing lever, said balance arm having a first end and a second end, said pivot point being between said first and second ends, (D) a pointer attached to said first end for pointing to said gauge, (E) a bale chute for holding a bale, (F) a chain attached to said second end and to said bale chute for supporting said bale chute wherein said bale chute is suspended below said second end, and (G) a double hinge attached to the baler and to said bale chute for attaching said bale chute to the baler wherein said bale chute may move vertically relative to the baler and said bale chute remains substantially perpendicular to the force of gravity, whereby said bale chute receives and temporarily holds a bale when a bale is ejected through the exit chute of the baler, the weight of the bale causing said bale chute and said second end of said balance arm to move downward until said balance arm reaches equilibrium, said pointer indicating a weight on said gauge, and the operator being able to determine the weight of the bale.

2. The weighing device of claim 1 further comprising a balance weight attached to said balance arm substantially at said first end for balancing said balance arm.

3. The weighing device of claim 2 wherein said balance weight is adjustably positionable relative to said pivot point wherein said weighing device may be adjusted for measuring different ranges of weight.

4. The weighing device of claim 1 wherein said balance arm comprises an angle between said first and second ends, said angle having a focal point substantially at said pivot point.

5. The weighing device of claim 4 wherein said angle is substantially twenty degrees.

6. The weighing device of claim 1 wherein said double hinge comprises at least one hinge member pivotably attached to the baler and pivotably attached to said bale chute.

7. A weighing device for measuring the weight of bales produced by a mobile baler while the baler is making bales, the mobile baler having an exit chute through which bales are discharged, the bale weighing device comprising:

(A) a support structure attached to the baler and located above the exit chute for supporting the weighing device, (B) at least one balance arm pivotably attached to said support structure at a pivot point on said balance arm for providing a balancing lever, said balance arm having a first end and a second end, said pivot point being between said first and second ends, (C) a bale chute for holding a bale, (D) a chain attached to said second end and to said bale chute for supporting said bale chute wherein said bale chute is suspended below said second end, (E) a double hinge attached to the baler and to said bale chute for attaching said bale chute to the baler wherein said bale chute may move vertically relative to the baler and said bale chute remains substantially perpendicular to the force of gravity, (F) an electrical position sensor for determining the relative position of said balance arm, and (G) an indicator located where an operator may observe said indicator for indicating the weight of a bale in response to the relative position of said balance arm, whereby said bale chute receives and temporarily holds a bale when a bale is ejected through the exit chute of the baler, the weight of the bale causing said bale chute and said second end of said balance arm to move downward until said balance arm reaches equilibrium, said position sensor determining the relative position of said balance arm, said display means displaying the weight of the bale, and the operator being able to observe the weight of the bale.

8. The weighing device of claim 7 further comprising a balance weight attached to said balance arm substantially at said first end for balancing said balance arm.

9. The weighing device of claim 8 wherein said balance weight is adjustably positionable relative to said pivot point wherein said weighing device may be adjusted for measuring different ranges of weight.

10. The weighing device of claim 7 wherein said balance arm comprises an angle between said first and second ends, said angle having a focal point substantially at said pivot point.

11. The weighing device of claim 10 wherein said angle is substantially twenty degrees.

12. The weighing device of claim 7 wherein said double hinge comprises at least one hinge member pivotably attached to the baler and pivotably attached to said bale chute.

13. The weighing device of claim 7 wherein said position sensor measures the angular position of said balance arm relative to said support structure.

14. The weighing device of claim 7 wherein said indicator is located in a control area near the operator.

* * * * *